US00RE42058E

(19) United States
(12) Reissued Patent
Golner et al.

(10) Patent Number: US RE42,058 E
(45) Date of Reissued Patent: Jan. 25, 2011

(54) AUTOMATIC DEHYDRATING BREATHER APPARATUS AND METHOD

(75) Inventors: Thomas M. Golner, Pewaukee, WI (US); Shirish P. Mehta, Waukesha, WI (US)

(73) Assignee: Waukesha Electric Systems, Inc., Waukesha, WI (US)

(21) Appl. No.: 12/708,730

(22) Filed: Feb. 19, 2010

Related U.S. Patent Documents

Reissue of:
(64) Patent No.: 7,332,015
Issued: Feb. 19, 2008
Appl. No.: 11/019,272
Filed: Dec. 23, 2004

U.S. Applications:
(60) Continuation-in-part of application No. 10/896,989, filed on Jul. 23, 2004, now Pat. No. 7,285,150, which is a division of application No. 10/235,795, filed on Sep. 6, 2002, now Pat. No. 6,797,037.

(51) Int. Cl.
*B01D 53/04* (2006.01)
*H01F 27/14* (2006.01)

(52) U.S. Cl. ..... 95/10; 95/11; 95/126; 96/111; 96/115; 96/146

(58) Field of Classification Search ..... 95/10, 95/11, 19, 117, 126; 96/111, 115, 146, 147; 55/385.4, DIG. 17; 174/14 R
See application file for complete search history.

(56) References Cited

U.S. PATENT DOCUMENTS

| | | | |
|---|---|---|---|
| 2,083,732 | A | 6/1937 | Moore et al. |
| 2,505,581 | A | 4/1950 | Unger |
| 3,559,382 | A | 2/1971 | Jaggard et al. |
| 3,572,008 | A | 3/1971 | Hankison et al. |
| 4,127,395 | A | 11/1978 | McKey et al. |
| 4,295,863 | A | 10/1981 | Lattuada |
| 4,322,223 | A | 3/1982 | Christel, Jr. |
| 4,504,286 | A | 3/1985 | Carlisle et al. |
| 4,543,446 | A | 9/1985 | Foss et al. |
| 4,546,442 | A | 10/1985 | Tinker |
| 5,427,609 | A | 6/1995 | Zoglman et al. |
| 5,902,381 | A | 5/1999 | Golner et al. |
| 6,071,321 | A | 6/2000 | Trapp et al. |
| 6,235,192 | B1 | 5/2001 | Melfi et al. |

FOREIGN PATENT DOCUMENTS

| | | | | |
|---|---|---|---|---|
| DE | 20104259 | U1 | | 6/2001 |
| EP | 0039504 | A1 | * | 11/1981 |
| EP | 1313112 | A1 | * | 5/2003 |
| JP | 61174707 | | * | 8/1986 |
| WO | WO 2004/022204 | A1 | * | 3/2004 |
| WO | WO 2004/088679 | A2 | * | 10/2004 |

OTHER PUBLICATIONS

Eipl.Ing. Ansgar Hinz and Dr. Karsten Viereck, "MTraB Maintenance–Free Dehydrating Breather for Application with Drying Assembly, Upgrading without a nervous breakdown Moisture Protection for New Assembly and Retrofit" with MTraB–DB1000 Type Series, pp. 1–4, no date given.*

* cited by examiner

*Primary Examiner*—Frank M Lawrence
(74) *Attorney, Agent, or Firm*—Baker Hostetler LLp

(57) ABSTRACT

A dehydrator breather is provided that includes automatic purging of accumulated moisture by detecting absorbed moisture in the breather, and closing an intake air channel, while opening an exit moisture channel. Adjustment of a default time-based purging cycle is adjusted to account for fluctuations in the detected moisture. An external communication capability is provided to enable off-site monitoring of the breather or the tank the breather is attached to.

30 Claims, 5 Drawing Sheets

AUTOMATIC DEHYDRATING BREATHER APPARATUS AND METHOD

Matter enclosed in heavy brackets [ ] appears in the original patent but forms no part of this reissue specification; matter printed in italics indicates the additions made by reissue.

This application is a continuation-in-part of U.S. patent application entitled "DEHYDRATING BREATHER APPARATUS AND METHOD", filed Jul. 23, 2004 having Ser. No. 10/896,989, currently pending, which is a Divisional application of U.S. patent application entitled "DEHYDRATING BREATHER APPARATUS AND METHOD", filed Sep. 6, 2002, having Ser. No. 10/235,795, now U.S. Pat. No. 6,797,037, the disclosures of which are incorporated by reference in their entirety.

FIELD OF THE INVENTION

This invention pertains generally to dehydrators for removing moisture from air. More particularly, the present invention is directed to automatic dehydrating breathers for power devices.

BACKGROUND OF THE INVENTION

High power electrical equipment, such as large electrical transformers, load tap changers, and circuit breakers, are typically immersed in oil, which is utilized to insulate and cool the power devices. Because the oil expands and contracts with temperature changes, such equipment is provided with a head space above the oil that is vented to the atmosphere to control the pressure in, for example, a transformer tank. The pressure in the tank has to be maintained such that air bubbles, which can decrease the dielectric strength of the oil, are inhibited from developing in the oil.

When the heat in the tank increases, the oil in the tank expands, the pressure in the tank increases, and air in the reservoir is forced from the tank. When the tank begins to cool down, the oil in the tank contracts, the pressure in the tank decreases, and air is drawn into the tank to maintain the pressure in the tank.

A dehydrator breather is conventionally utilized to regulate airflow into and out of the tank. In some dehydrating breathers, a vent is provided between the vessel and the outside air. A valve is positioned between the vent and dehydrator breather container that controls the pressure in the tank by opening and closing, as necessary, to control air flow into and out of the tank.

Often, the dehydrator breather includes a desiccant material, such as a silica gel, to remove any moisture from the air before it is allowed into the tank. Water is a conductor, and thus, moisture entering the tank has the capability of destroying the electrical properties of the transformer.

Problems arise, however, when the desiccant escapes the desiccant container. For example, during shipment, the desiccant may break into fine pieces that escape the desiccant container. In addition, desiccant particles may pass through the valve with air that is exiting the dehydrator breather, and become trapped in the valve and/or trapped on top of the vent.

Further, moisture, which evaporates from the drying of the desiccant, often forms condensation on the walls of the dehydrator breather. When the condensation returns to a liquid state, it flows through the valve and out to the atmosphere via the holes in the vent. However, if the desiccant particles are trapped in the valve or clog the vent, the moisture may become trapped in the vessel and the desiccant may be unable to dry out completely. As a result, the dehydrating breather will not be able to perform its drying functions.

Accordingly, it would be desirable to provide a dehydrator breather that does not allow desiccant particles, which may escape the desiccant container, from disturbing the operation of the dehydrator.

SUMMARY OF THE INVENTION

The foregoing needs are met, to a great extent, by the present invention, wherein, in one aspect, a dehydrator breather is provided that includes a vessel, a valve housing coupled to the vessel, and a vent assembly coupled to the valve housing. The vent assembly includes a vent assembly body, and at least one screened port. The screened port is disposed along a vertical axis of the vent assembly body. Moisture that is absorbed by a desiccant material in the vessel is expelled from the vessel via the vent, which is operably closed and opened during the expelling process.

In another aspect of the present invention, a dehydrating breather apparatus, for dehydrating air in a container comprising, a vessel body, an automatically closeable air flow passage in the vessel body coupled to the container, a desiccant contained within the vessel body, an electrically controlled heating element housed in the vessel body, a drain in the vessel body, and a moisture sensor in the desiccant.

In another aspect of the present invention, the dehydrating breather apparatus for dehydrating air in a container, comprising, a dehydrating means for absorbing moisture in the air and expelling moisture, an air flow means for channeling air in the container between the container and the dehydrating means, an exit means for channeling expelled moisture, an automatic airflow blocking means for blocking channeled air in the airflow means, an automatic exit blocking means for blocking the expelled moisture in the exit means, a heating means in the dehydrating means for heating for causing the absorbed moisture to be released from the dehydrating means, moisture sensing means for sensing moisture in the air of the container, and a control means for controller the heating means and the airflow blocking means and the exit blocking means.

In another aspect of the present invention, a method for dehydrating air in a container, coupling, attaching a housing with desiccant to an air channel connected the container, monitoring a humidity of the desiccant, purging moisture from the desiccant by heating the desiccant, disposing of the purged moisture by closing the air channel and opening an exit port on a bottom of the housing.

There has thus been outlined, rather broadly, certain embodiments of the invention in order that the detailed description thereof herein may be better understood, and in order that the present contribution to the art may be better appreciated. There are, of course, additional embodiments of the invention that will be described below and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of embodiments in addition to those described and of being practiced and carried out in various ways. Also, it is to be understood that the phraseology and terminology employed herein, as well as the abstract, are for the purpose of description and should not be regarded as limiting.

As such, those skilled in the art will appreciate that the conception upon which this disclosure is based may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

DETAILED DESCRIPTION OF THE DRAWINGS

Figure 1:
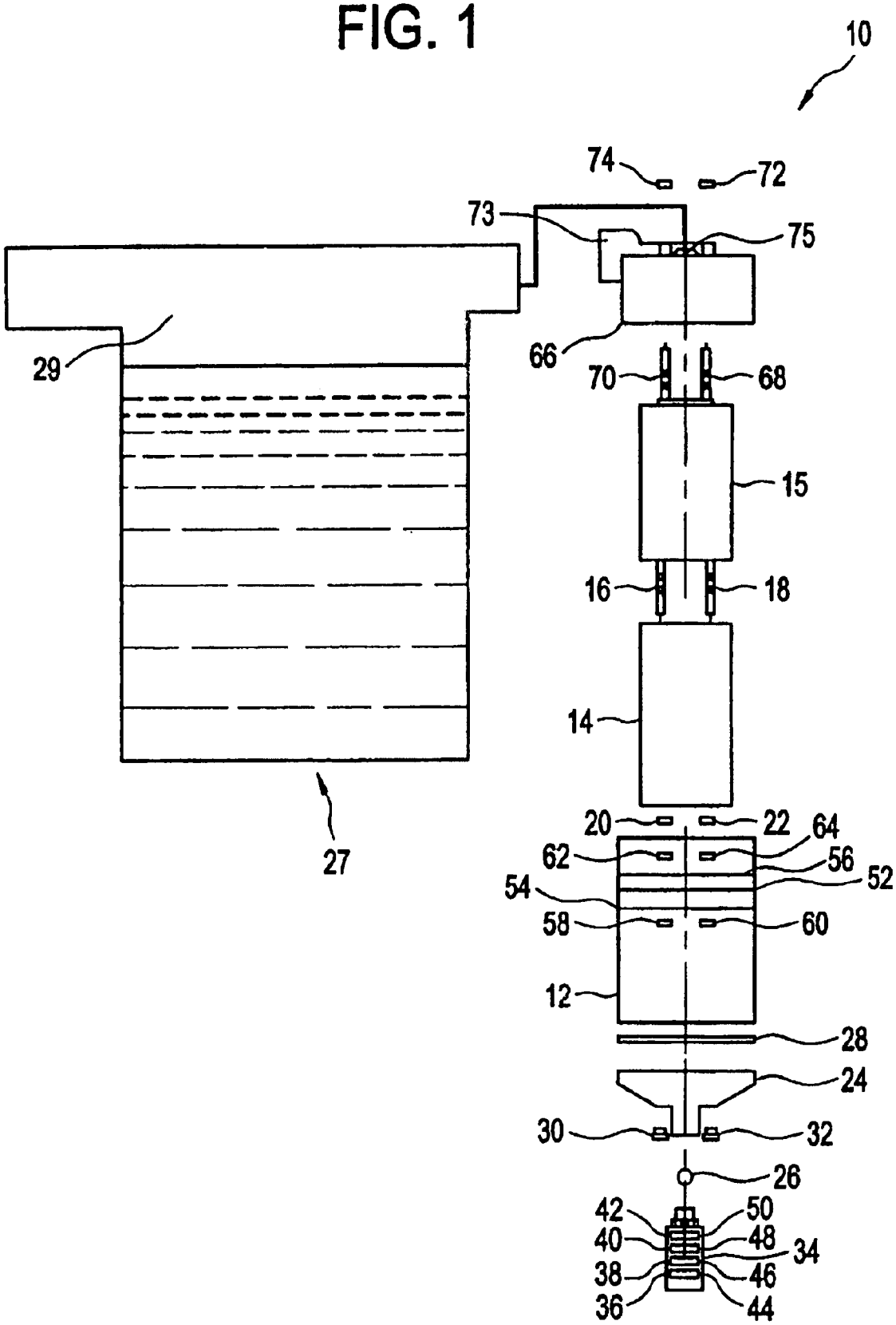
FIG. 1 is an exploded view of an exemplary dehydrating breather in accordance with the present invention.

Referring now to FIG. 1 of the figures, wherein like reference numerals indicate like elements, there is shown in FIG. 1 a dehydrating breather 10 in accordance with the present invention. As shown in FIG. 1, the dehydrating breather 10, includes a vessel 12 that, in an exemplary embodiment of the present invention, is formed of a glass or a transparent plastic, such as polycarbonate. In an exemplary embodiment of the present invention, as shown in FIG. 1, the vessel 12 is cylindrical in shape.

A container 14 is mounted within the interior of the vessel 12 and is utilized to contain desiccant. A heater 15 is positioned within the desiccant container 14, and is utilized to drive moisture from the desiccant. In an exemplary embodiment of the present invention, mounting mechanisms 16, 18, for example, threaded screws and locking devices 20, 22, such as bolts, secure the heater 15 to the desiccant container 14. The heater 15 maybe anyone of thermal devices, including, but not limited to a positive temperature coefficient (PTC) heater, capable of maintaining a self-regulated operation.

In an exemplary embodiment of the present invention, the desiccant container 14 is made from a screen material providing openings in the desiccant container 14. In the same or another exemplary embodiment of the present invention, the desiccant is coated with an indicating substance that causes the color of the desiccant to change according to the degree of moisture that it is retaining. The openings in the desiccant container 14 allow the desiccant to be viewed from outside of the desiccant container 14, and thus, allow the condition of the desiccant to be ascertained. The openings in the desiccant container 14 also allow moisture to escape the desiccant container.

Coupled to the bottom of the vessel 12 is a valve housing 24. In an exemplary embodiment of the present invention, the valve housing 24 includes a floating ball 26. The ball 26 fits within the valve housing 24 and controls air flow into and out of the vessel 12, according to a differential in air pressure between the vessel 12 and, for example, a transformer tank 27.

For example, when the oil 29 expands within a transformer tank 27, air in a head space 29 is forced from the transformer tank 27 and into the vessel 12. Accordingly, the air pressure in the transformer tank 27 is greater than the air pressure in the vessel 12. The ball 26 is sufficiently light, such that it moves up, so air can flow from the vessel 12 through the housing 24.

When the air pressure inside of the vessel 12 is greater than the air pressure inside the transformer tank 27, the ball 26 moves upward, so that air can be expelled from the head space 29, through the vessel 12, and out of the housing 24. When the air pressure inside of the vessel 12 is greater than the air pressure inside the transformer tank 27, the ball 26 moves upward to allow air to flow into the housing 24 and/or vent assembly 34, through the vessel 12, and into the head space 29 of the transformer tank 27. When there is no pressure differential between, for example, the transformer tank 27 and the interior of the vessel 12, the ball 26 blocks the admission of air into the vessel 12 to prevent unnecessary admittance of air, which may be moisture-laden, into the dehydrator breather 10 and transformer tank 27.

In an exemplary embodiment of the present invention, a seal 28, for example, a gasket, is provided between the vessel 12 and the housing 24 to prevent moisture from entering the dehydrator breather 10 at the location where the vessel 12 meets the housing 24. In an exemplary embodiment of the present invention, the mounting mechanisms 16, 18 and locking mechanisms 30, 32 are utilized to secure the housing 24 to the vessel 12.

In an exemplary embodiment of the present invention, a vent assembly includes sintered bronze vents. In another exemplary embodiment of the present invention, the vent assembly 34, for example a muffler, is coupled to the valve housing 24. The muffler 34 of the present invention improves the operation of the breather because the sintered bronze vents have fine openings that may trap desiccant particles that escape the desiccant container 14. The muffler 34 and the valve housing 24, in an exemplary embodiment of the present invention, have threaded portions, such that the muffler 34 is threadably attached to the valve housing 24, and can be easily unscrewed from the valve housing 24.

In the same or another exemplary embodiment of the present invention, the muffler 34 has openings, for example, vertically disposed ports 36-42. In an exemplary embodiment of the present invention, the ports 36-42 are covered with screen material 44-50. The screened ports 36-42 allow air to flow into and out of the vessel 12. The screened ports 36-42 also serve to filter particles from the air being drawn into the muffler 34. It should be understood that the number of screens utilized to fully cover the ports 36-42 may vary.

The vent assembly 34 may also be utilized to capture any desiccant particles that may escape the desiccant container 14 and pass through the valve housing 24. In an exemplary embodiment of the present invention, the screen ports 36-42 are disposed along a vertical axis of the vent assembly 34. Thus, if any desiccant particles happen to block one of the screened ports, for example, screened port 36, a screen port positioned above the blocked screen port, such as screened port 38, will still allow air to enter and exit the valve housing 24.

When the vent assembly 34 no longer has the ability to accommodate any additional desiccant particles, the vent assembly 34 can be unscrewed from the valve housing 24, so that the desiccant particles can be emptied. In addition, the vent assembly 34 allows any water that passes through the valve housing to escape through the screened openings. Accordingly, the design of a dehydrator breather in accordance with the present invention prevents desiccant particles from interfering with the flow of air into and out of the valve housing 24.

In an exemplary embodiment of the present invention, fifty mesh stainless steel screen material is utilized for ports 36-42. In an exemplary embodiment of the present invention, the body/vent housing of the vent assembly 34 is made from a plastic material. In an exemplary embodiment of the present invention, the vent assembly is a high flow muffler, manufactured by Adsens Technology of City of Industry, Calif.

In an exemplary embodiment of the present invention, a filter 52 is positioned within the vessel 12. In an exemplary embodiment of the present invention, the filter 52 is made from a fiberglass paper. In the same or another exemplary embodiment of the present invention, supports 54, 56 are utilized to secure the filter 52 within the vessel 12. In an exemplary embodiment of the present invention, the mounting mechanisms 16, 18,are utilized to secure the filter 52 and support screens 54, 56 within the vessel. Securing mechanisms, such as bolts 58-64, are utilized to secure the supports 54, 56 to the filter 52.

The filter 52 prevents desiccant particulate that escapes the desiccant container 14 from entering the valve housing 24. Thus, the filter 52 prevents loose desiccant particulate from plugging the valve housing 24. In addition, moisture which seeks to exit the vessel 12 through the valve housing 24 is prevented from accumulating in the valve housing, and not allowing the desiccant to dry.

A cap 66 is provided to seal the desiccant container. Mounting mechanisms 68, 70 and locking mechanisms 72, 74, for example, threaded screws and bolts, are utilized to secure the cap 66 to the vessel 12 via the heater 15. A connector 73 is provided for connecting the breather 10 to, for example, an auxiliary electrical box to control operations of the heater 15. A port 75 is provided for connecting the dehydrator breather 10 to, for example, the air head space 29 of the transformer tank 27.

Figure 2:
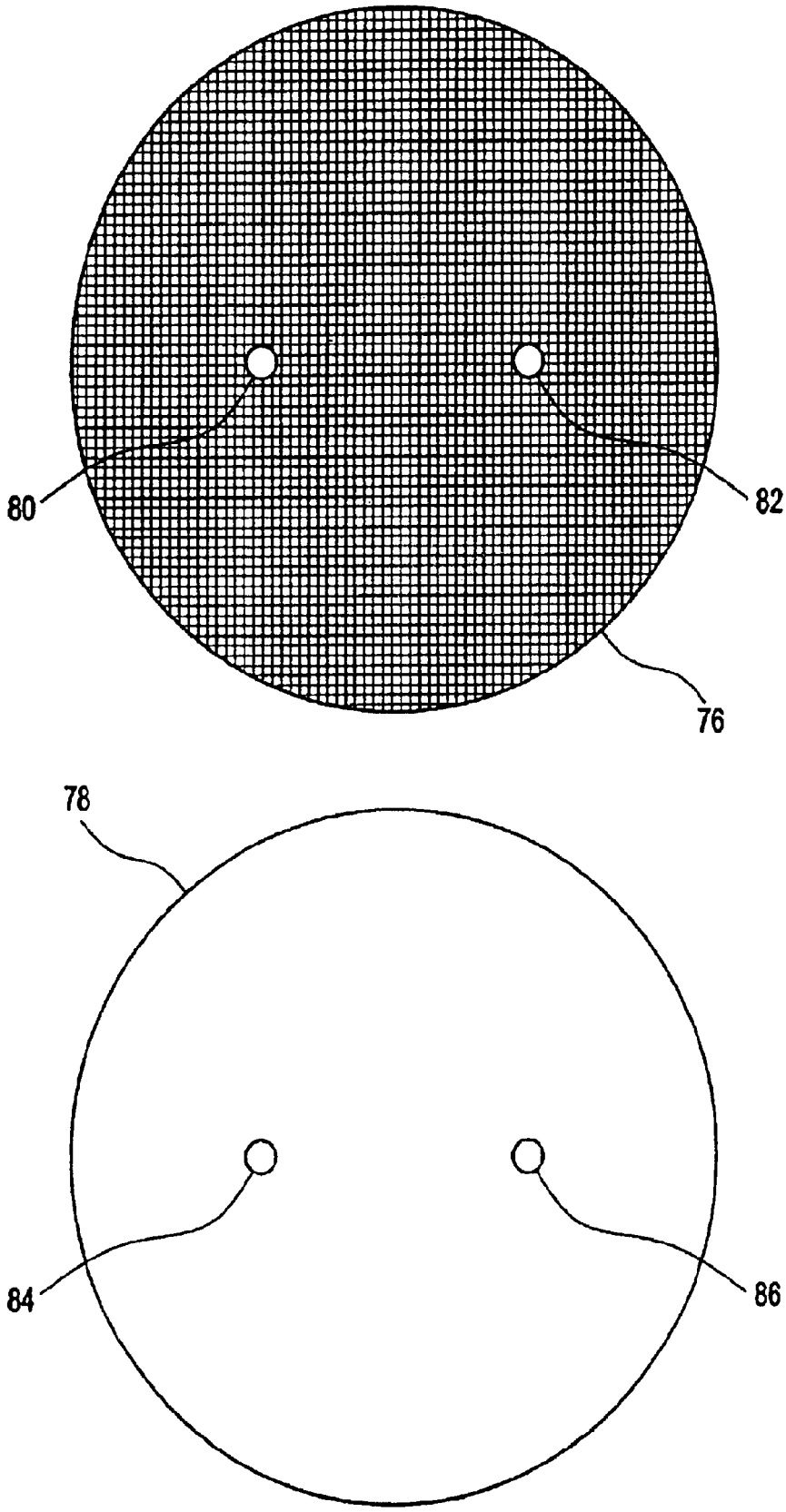
FIG. 2 is a front elevation view of an exemplary filter and filter support.

Shown in FIG. 2 is a filter support 76 and filter 78 in accordance with the present invention. Ports 80 and 82 may be provided in the filter support 76 that align with ports 84, 86 of the filter 78. In an exemplary embodiment of the present invention, the filter 78 and filter support 76 are cylindrical in shape. In the same or another exemplary embodiment of the present invention, the filter support 76 is made from a screen material.

Figure 3:
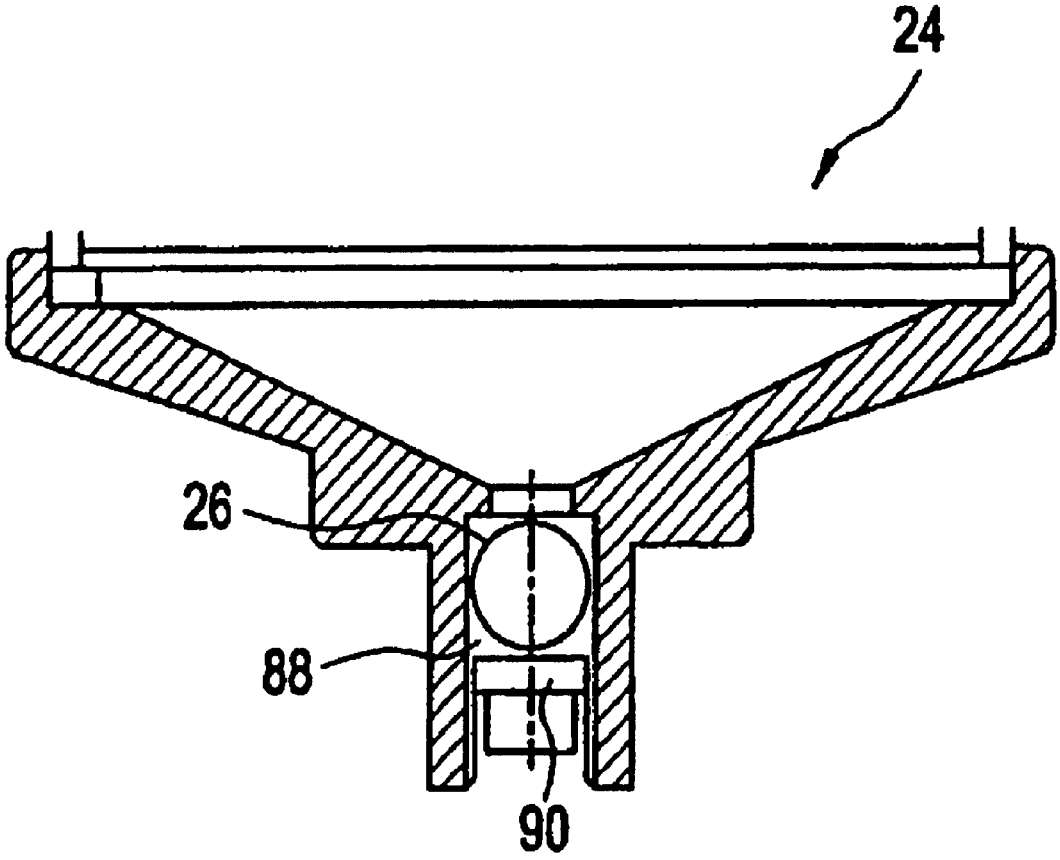
FIG. 3 is a cross-sectional view of an exemplary valve housing.

Shown in FIG. 3 is a cross-sectional view of a valve housing 24 in accordance with the present invention. As shown in FIG. 3, a valve 88 is formed with the valve housing 24. In an exemplary embodiment of the present invention, the valve 88 is a floating ball valve where a ball 26 is positioned at valve seat 90.

Figure 4:
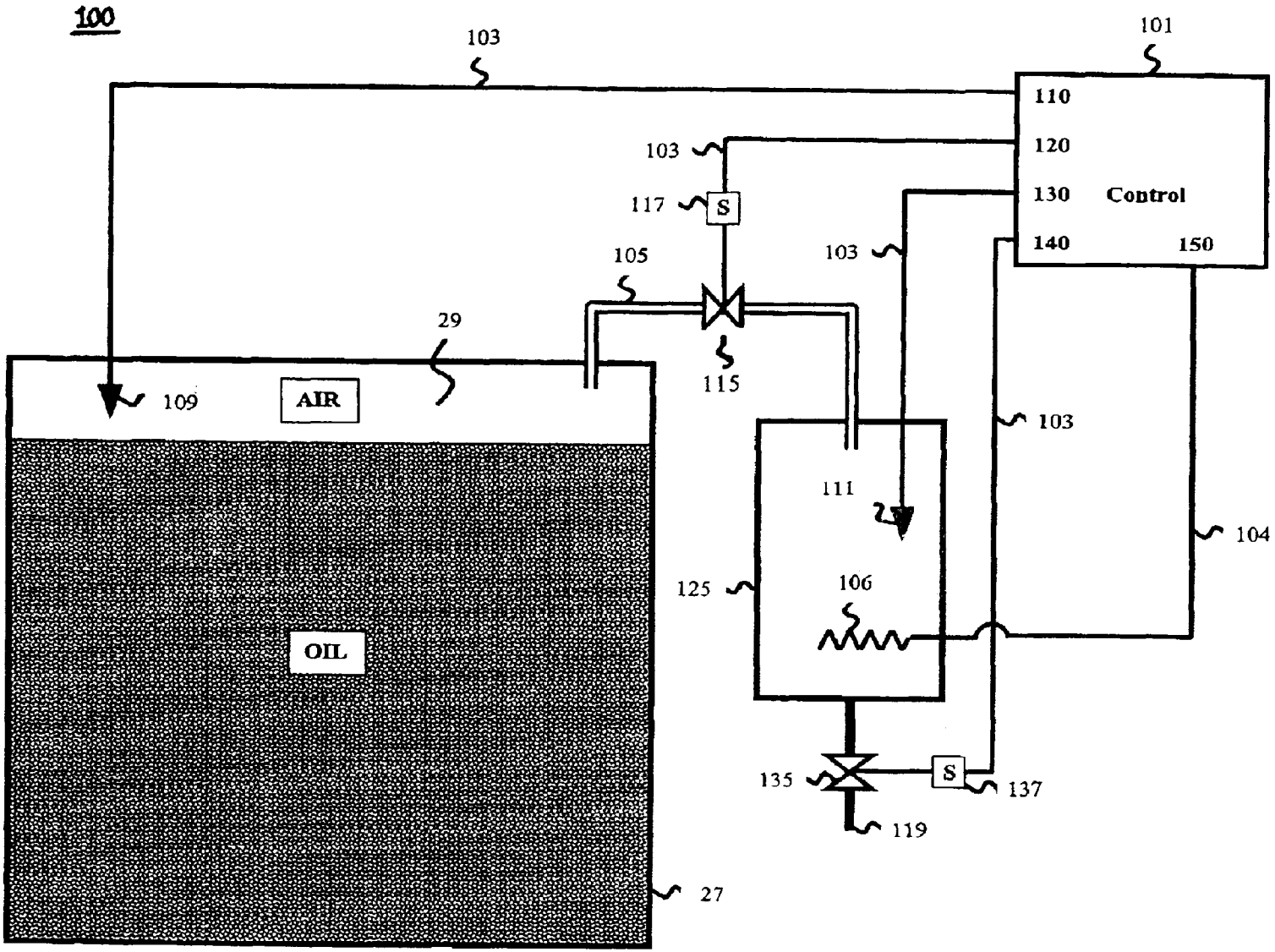
FIG. 4 is a block diagram of another exemplary breather system.

FIG. 4 is a block diagram of 100 of another exemplary breather connected to the tank 27. The exemplary breather 125 having a desiccant (not shown) is coupled to a tank 27 having an air and oil 29 therewithin. The exemplary breather 125 is coupled to an air passageway 105 to facilitate admission of air 29 from the tank 27 to the exemplary breather 125. The flow of the air in the air passageway 105 is controlled by a solenoid 117 to actuate a valve 115. The solenoid 117 is controlled by a control module 101 via signal/power line 103. Moisture or humidity sensors 109 and 111 are provided in the air 29 of the tank 27 and in the exemplary breather 125, respectively. The humidity sensors 109 are coupled to the control module 101 via signal/power lines 103.

At a suitable location of the exemplary breather 125, another solenoid 137 actuated valve 135 is provided to control the passage of water accumulated in the breather 125 via exit port 119. The solenoid 137 is controlled by a signal/power line 103 coupled to the control unit 101. The exemplary breather 125 contains a heating element 106 controlled by the control module 101 via signal/power line 104. The connections to the control module 101 for signal/power lines 103, and 104 are respectively indicated as 110, 120, 130, 140, and 150 in the control module 101.

In operation, the control module 101 senses the humidity within the air 29 of the tank 27 via humidity sensor 109 and the humidity in the exemplary breather 125 via humidity sensor 111. Based on either or both humidity readings from the humidity sensors 109 and 111, the control module 101 initiates a moisture purging cycle for the breather 125 by activating the signal/power line 104 to heat the heating element 106. Prior to or coincident with the initiation of the heating cycle, the control module 101 generates signal to the solenoid 117 coupled to the valve 115 in the air passageway 105 to close the valve 115. Closing of the valve 115 is initiated to prevent re-introduction of moisture from the breather 125 into the air 29 of the tank 27 via the air passageway 105. By blocking this conduit to the air 29 of the tank 27, the only avenue for moisture expulsion from the breather 125 is via the exit port 119, controlled by the combination of valve 135 and solenoid 137. During the purging cycle, the control module 101 opens the valve 135 to enable flushing of excess or accumulated moisture in the breather 125. Upon appropriate purging of the moisture from the breather 125, the control module 101 closes the valve 135 by control of the solenoid 137. Upon appropriate conclusion of the purging cycle, the closed valve 115 in the air passageway 105 can be opened. Control of the timing of the opening and closing of the respective valves 115 and 135 may be coordinated by appropriate readings from the humidity sensors 109 and 111.

By utilizing a moisture sensor 111 in the breather 125, the exemplary embodiment described in FIG. 4 can provide override capability when used in humidity-timer configuration, as discussed below. It should be appreciated that while the exemplary embodiment of FIG. 4 illustrates the solenoids 117 and 137 as being separate from the respective valves 115 and 135, one-piece solenoid valve systems may be used without departing from the spirit and scope of this invention. Additionally, separate control and power lines may be used, rather a single control/power line for each device. Furthermore, the solenoids 117 and 137 may be coupled to each other to operate in tandem.

Figure 5:
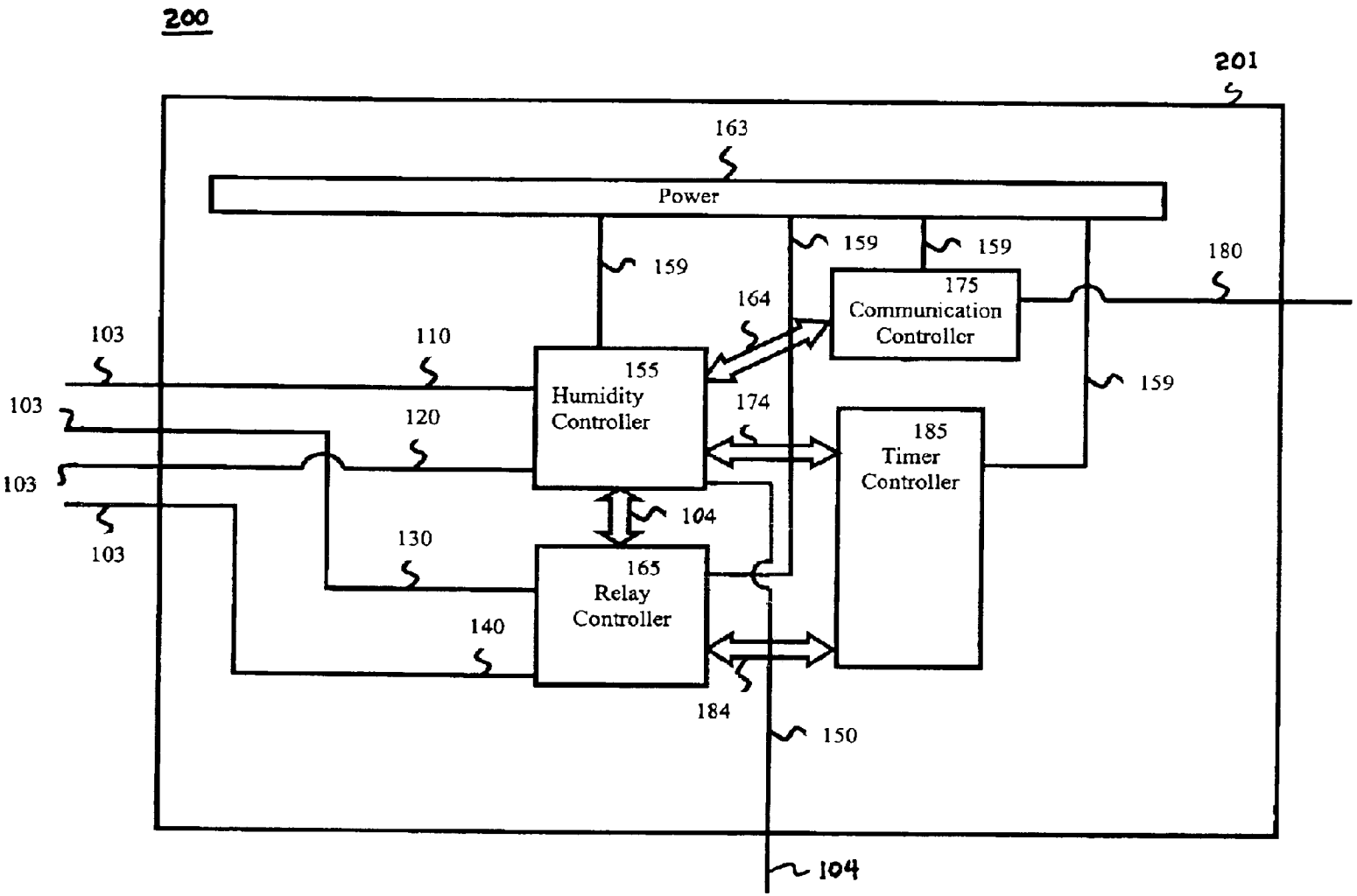
FIG. 5 is a block diagram of an exemplary control module for the exemplary breather.

FIG. 5 is a block diagram 200 that illustrates an exemplary control module 201. Exemplary control module 201 contains a power terminal 163 supplying power via power lines 159 to a humidity controller 155, relay controller 165, optional communications (COM) controller 175 and optional timer controller 185. Communication and controlled functions are conveyed to the relay controller 165, COM controller 175, and timer controller 185 to and from the humidity controller 155 via signal/data buses 104, 164, and 174, respectively. An independent signal/bus 184 is provided between the timer controller 185 and the relay controller 165 for independent control of the relay controller 165. A communication line/bus 180 is coupled to the COM controller 175 for external communication.

It should be appreciated that in the exemplary embodiments described, the relay controller 165 is a mechanical relay, however, non-mechanical relays or switches may be used, such as, for example, switching transistors, logic circuits, etc., without departing from the spirit and scope of this invention. Further, the various capabilities of the humidity controller 155 and timer controller 185 may be accomplished via the use of discrete components or circuits or integrated circuits, as desired. Based on the description of the invention described herein, one of ordinary skill may utilize off-the-shelf products or customized products to achieve the desired various controllers described herein, or modify the products, in various combinations, as needed. For example, while the COM controller 175 is illustrated as not being in direct control or communication with the timer controller 185, one may devise a control and/or communication path with the timer controller 185, to enable direct control of the timer controller 185, as needed.

When used with a timer controller 185, the exemplary control module 201 can provide override functions to increase purging of the breather 125 in circumstances when the timer period designated in the timer controller 185 lag the necessary period determined by the humidity controller 155. Conversely, the humidity controller 155 may delay activation of the purging when the humidity controller 155 determines that the timing period set in the timer controller leads the appropriate purging intervals. For example, the timer controller 185 may be designated to have a fixed repetition period and a fixed purging duration. Due to the fixed periods and durations allocated therein, the timer controller 185 may not properly account for excess humidity buildup during the spring or winter seasons. Moreover, excess purging cycles or durations may degrade the desiccant in the breather 125. By use of a humidity controller 155 having override capability, more efficient purging can be performed, thereby, prolonging the life of the desiccant contained within the breather 125.

It should be appreciated that the override capability of the humidity controller 155 may include adjustment of the designated time periods and durations of operation of the timer controller 185, as needed. For example, the humidity controller 155 may be activated only once every four or five timer cycles, for example. Thus, if after a selected number of cycles of operation of purging by the timer controller 185, the humidity controller 155 may be activated to determine if sufficient purging of the air 29 in the tank 27 or the breather 125 has been accomplished. If sufficient purging has not been satisfactorily accomplished by the time periods or durations provided by the timer controller 185, the humidity controller 155 may selectively adjust the periods or durations therein to facilitate more efficient purging.

The COM controller 175 enables the control module 201 to provide communication to an external system such as, for example, a monitoring station (not shown). By providing an external communication capability, using anyone or more of commonly known or future developed communication schemes, the exemplary control module 201 can signal a monitoring station if detected humidity within the breather 125 or tank 27 is above acceptable levels. An instance of such an occurrence may arise if there is a failure in the breather 125 or a leak in the tank 27, of which the breather 125 is not rated to properly dehumidify.

It should be appreciated that various modifications to the embodiments described here and may be made without departing from the spirit and scope of this invention. For example, a temperature sensor may be utilized in addition to the humidity sensors 109 and 111 to ascertain dew points. Alternatively, a humidistat may be used as deemed appropriate. Furthermore, the humidity sensors 109 and 111 may contain a dielectric property detector to determine the dielectric characteristics of the desiccant.

The many features and advantages of the invention are apparent from the detailed specification, and thus, it is intended by the appended claims to cover all such features and advantages of the invention which fall within the true spirit and scope of the invention. Further, since numerous modifications and variations will readily occur to those skilled in the art, it is not desired to limit the invention to the exact construction and operation illustrated and described, and accordingly, all suitable modifications and equivalents may be resorted to, falling within the scope of the invention.

What is claimed is:

1. A dehydrating breather apparatus, for dehydrating air in a container comprising:

a vessel body;

an automatically closeable air flow passage in the vessel body coupled to the container;

a valve housing, said valve housing coupled to the vessel body and secured with a mounting mechanism;

a seal positioned between the valve housing and the vessel body;

a floating ball valve positioned within the valve housing, said floating ball valve comprising a first width that accommodates a floating ball and a second width that is narrower than the first width to prevent passage of the floating ball;

a vent assembly, said vent assembly coupled to the valve housing and comprising:

a vent assembly body;

sintered bronze vents for trapping desiccant particles;

at least one screened port, said screened port disposed along a vertical axis of the vent assembly body;

a desiccant contained within the vessel body;

an electrically controlled heating element housed in the vessel body;

a drain in the vessel body; and a moisture sensor in the desiccant.

2. The dehydrating breather apparatus of claim 1, further comprising:

a moisture sensor in the container.

3. The dehydrating breather of claim 1, further comprising:

a control unit to control an automatic closing and opening of the airflow passage and the drains and heating of the heating element.

4. The dehydrating breather of claim 3, wherein the control unit is coupled to the moisture sensor.

5. The dehydrating breather apparatus of claim 3, wherein the control unit comprises:

a humidity controller;

a relay controller; and a communications controller coupled to the humidity sensor controller.

6. The dehydrating breather apparatus of claim 5, further comprising:

a timer controller coupled to the humidity controller and to the relay controller.

7. The dehydrating breather of claim 1, further comprising:

a dielectric property sensor in the vessel body.

8. A dehydrating breather apparatus for dehydrating air in a container, comprising:

a dehydrating means for absorbing moisture in the air and expelling moisture;

an air flow means for channeling air in the container between the container and the dehydrating means;

an exit means for channeling expelled moisture;

an automatic airflow blocking means for blocking channeled air in the airflow means;

an automatic exit blocking means for blocking the expelled moisture in the exit means, wherein the automatic exit blocking means comprises a first width that is wider than a second width;

a housing means for housing the automatic exit blocking means;

a seal means for sealing the automatic exit blocking means;

a trapping means for trapping desiccant particles;

a heating means in the dehydrating means for heating for causing the absorbed moisture to be released from the dehydrating means;

a moisture sensing means in the air of the container for sensing moisture; and a control means for controlling the heating means and the airflow blocking means and the exit blocking means.

9. The dehydrating breather of claim 8, wherein the control means comprises:

a moisture response means for responding to the moisture sensing means;

a timer means for cycling of time periods and durations;

a switch means for controlling power to the blocking means and the heating means.

10. The dehydrating breather of claim 9, wherein the control means further comprises:

a communication means for communicating information to an external device, wherein the communication means initiates or inhibits a regeneration cycle.

11. The dehydrating breather of claim 8, further comprising:

a second moisture sensing means in the dehydrating means for sensing moisture.

12. A dehydrating system, comprising:

a tank with air enclosed therein;

a vessel body;

an automatically closeable airflow passage in the vessel body coupled to the tank;

a valve housing, said valve housing coupled to the vessel body and secured with a mounting mechanism;

a seal positioned between the valve housing and the vessel body;

a floating ball valve positioned within the valve housing, said floating ball valve comprising a first width that accommodates a floating ball and a second width that is narrower than the first width to prevent passage of the floating ball;

a vent assembly, said vent assembly coupled to the valve housing and comprising:

a vent assembly body;

sintered bronze vents for trapping desiccant particles;

at least one screened port, said screened port disposed along a vertical axis of the vent assembly body;

desiccant contained within the vessel body;

an electrically controlled heating element housed in the vessel body;

an automatically closeable drain in the vessel body; and a moisture sensor in the desiccant.

13. The dehydrating system of claim 12, further comprising:

a moisture sensor in the tank.

14. A method for dehydrating air in a container, comprising:

attaching a vessel body with desiccant to an air channel connected to the container;

coupling a valve housing to the vessel body, the valve housing secured with a mounting mechanism;

positioning a seal between the valve housing and the vessel body;

positioning a floating ball valve within the valve housing, the floating ball valve comprising a first width that accommodates a floating ball and a second width that is narrower than the first width to prevent passage of the floating ball;

coupling a vent assembly to the valve housing, the vent assembly comprising:

a vent assembly body;

sintered bronze vents for trapping desiccant particles;

at least one screened port, said screened port disposed along a vertical axis of the vent assembly body;

monitoring a humidity of the desiccant;

purging moisture from the desiccant by heating the desiccant;

disposing of the purged moisture by closing the air channel and opening an exit port on a bottom of the housing.

15. The method for dehydrating of claim 14, further comprising:

adjusting a period of purging based on a level of humidity monitored in the desiccant.

16. The method for dehydrating of claim 14, further comprising:

communicating information to an external system.

*17. A dehydrating breather for a transformer tank, comprising:*

*a vessel;*

*a desiccant container, including desiccant and a heater, disposed within the vessel;*

*a detachable vent assembly, including at least one screened port, to retain loosened desiccant and to drain purged moisture; and*

*means for preventing reintroduction of moisture from the vessel to the tank during a heating cycle.*

*18. The dehydrating breather according to claim 17, further comprising a sensor to determine when to begin the heating cycle.*

*19. The dehydrating breather according to claim 17, wherein the air flows from the vessel to the atmosphere during the heating cycle.*

*20. The dehydrating breather according to claim 19, wherein prior to, or coincident with, initiation of the heating cycle, the means for preventing reintroduction of moisture ensures that air is not flowing from the vessel to the tank.*

*21. The dehydrating breather according to claim 20, wherein the means for preventing reintroduction of moisture prevents air flow from the vessel to the tank during the heating cycle.*

*22. The dehydrating breather according to claim 21, wherein the means for preventing reintroduction of moisture includes a solenoid-controlled valve disposed between the vessel and the tank.*

*23. A method for regulating moisture within a dehydrating breather coupled to a transformer tank, comprising:*

*removing moisture from incoming air with a desiccant;*

*heating the desiccant to purge the absorbed moisture;*

*draining the purged moisture through a detachable vent assembly that includes at least one screened port;*

*retaining loosened desiccant in the detachable vent assembly; and*

*preventing reintroduction of moisture from the dehydrating breather to the tank by heating the desiccant only when air is not flowing to the tank.*

*24. The method according to claim 23, wherein said heating the desiccant is based on a sensor measurement.*

*25. The method according to claim 24, wherein the sensor measurement is a humidity level.*

*26. The method according to claim 25, wherein the humidity level is measured by a sensor disposed within the dehydrating breather.*

*27. The method according to claim 25, wherein the humidity level is measured by a sensor disposed within the tank.*

*28. The method according to claim 23, wherein said preventing reintroduction of moisture includes closing a solenoid-operated valve, disposed between the dehydrating breather and the tank, to prevent air from flowing to the tank.*

*29. The method according to claim 28, wherein the solenoid-operated valve is closed prior to, or coincident with, heating the desiccant.*

*30. A dehydrating breather for a transformer tank, comprising:*

*a vessel;*

*a desiccant container, including desiccant and a heater, disposed within the vessel;*

*a detachable vent assembly, including at least one screened port, to retain loosened desiccant and to drain purged moisture; and*

*a device to prevent reintroduction of moisture from the vessel to the tank during a heating cycle.*

* * * * *